United States Patent
Korl et al.

(10) Patent No.: US 11,050,983 B2
(45) Date of Patent: Jun. 29, 2021

(54) SYSTEM AND METHOD FOR RECALIBRATING A PROJECTOR SYSTEM

(71) Applicant: Hilti Aktiengesellschaft, Schaan (LI)

(72) Inventors: Sascha Korl, Buchs (CH); Vinod Khare, Westminster, CO (US); Yujia Zhang, Columbus, OH (US)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/637,965

(22) PCT Filed: Jul. 25, 2018

(86) PCT No.: PCT/EP2018/070168
§ 371 (c)(1),
(2) Date: Feb. 10, 2020

(87) PCT Pub. No.: WO2019/029991
PCT Pub. Date: Feb. 14, 2019

(65) Prior Publication Data
US 2020/0186768 A1    Jun. 11, 2020

Related U.S. Application Data

(63) Continuation of application No. 15/970,764, filed on May 3, 2018, now abandoned, which is a continuation (Continued)

(51) Int. Cl.
*H04N 9/31* (2006.01)
*G06T 3/00* (2006.01)
(Continued)

(52) U.S. Cl.
CPC ....... *H04N 9/3185* (2013.01); *G01B 11/2513* (2013.01); *G01C 11/025* (2013.01);
(Continued)

(58) Field of Classification Search
CPC .................. H04N 9/3147; H04N 9/3185
See application file for complete search history.

(56) References Cited

U.S. PATENT DOCUMENTS

| 6,310,650 B1 | 10/2001 | Johnson et al. |
| 6,437,823 B1 | 8/2002 | Zhang |
| 6,525,772 B2 * | 2/2003 | Johnson .................. H04N 9/12 348/189 |
| 6,618,076 B1 * | 9/2003 | Sukthankar .............. H04N 5/74 345/156 |

(Continued)

FOREIGN PATENT DOCUMENTS

WO    WO 2016/168786 A1    10/2016

OTHER PUBLICATIONS

PCT/EP2018/070168, International Search Report dated Nov. 19, 2016 (Three (3) pages).

*Primary Examiner* — Paulos M Natnael
(74) *Attorney, Agent, or Firm* — Crowell & Moring LLP

(57) ABSTRACT

A system and method for recalibrating a projector system. The system includes one or more cameras, a projector, and at least one processor. The at least one processor is configured to execute stored instructions to project one or more patterns on to a work surface via the projector, capture images of the projected one or more patterns via the one or more cameras, perform analysis on the captured images of the one or more patterns, determine projector calibration parameters based at least in part on the performed analysis on the captured images, and recalibrate the projector system such that an image is projected onto the work surface by the projector at a correct position based on the determined projector calibration parameters.

15 Claims, 3 Drawing Sheets

Related U.S. Application Data of application No. 15/674,755, filed on Aug. 11, 2017, now abandoned.

(51) Int. Cl.

| | | |
|---|---|---|
| *G06T 7/80* | (2017.01) | |
| *G01C 11/02* | (2006.01) | |
| *G01B 11/25* | (2006.01) | |
| *H04N 5/247* | (2006.01) | |
| *G06T 7/521* | (2017.01) | |

(52) U.S. Cl.
CPC .............. *G06T 3/005* (2013.01); *H04N 5/247* (2013.01); *H04N 9/317* (2013.01); *H04N 9/3194* (2013.01); *G06T 7/521* (2017.01); *G06T 7/80* (2017.01); *G06T 2207/20012* (2013.01); *G06T 2207/30244* (2013.01); *H04N 9/3161* (2013.01)

(56) References Cited

U.S. PATENT DOCUMENTS

| | | | |
|---|---|---|---|
| 7,483,550 B2 | 1/2009 | Oka et al. | |
| 8,106,949 B2 | 1/2012 | Tan et al. | |
| 8,711,225 B2 | 4/2014 | Chang et al. | |
| 8,872,924 B1* | 10/2014 | Lin | G06F 3/1446 |
| | | | 348/189 |
| 8,893,060 B2* | 11/2014 | Feng | G06F 30/20 |
| | | | 716/54 |
| 9,121,692 B2* | 9/2015 | Kahle | G01B 11/14 |
| 9,943,282 B2* | 4/2018 | Katsumata | A61B 6/5205 |
| 10,210,607 B1* | 2/2019 | Weinschenk | G01B 11/26 |
| 2004/0201823 A1 | 10/2004 | Raskar et al. | |
| 2013/0258116 A1* | 10/2013 | Chang | H04N 9/3179 |
| | | | 348/188 |
| 2013/0307995 A1 | 11/2013 | Nakata | |
| 2017/0074808 A1 | 3/2017 | Bernard et al. | |
| 2017/0161889 A1 | 6/2017 | Rueb | |
| 2018/0203437 A1 | 7/2018 | Kubat et al. | |

* cited by examiner

200

SYSTEM AND METHOD FOR RECALIBRATING A PROJECTOR SYSTEM

BACKGROUND OF THE INVENTION

The invention relates to determining projector calibration parameters in order to recalibrate a projector system and project an image onto a work surface at the correct position based on the determined projector calibration parameters.

Projection mapping, which may also be known as video mapping or spatial augmented reality, is a projection technology used to turn physical objects (often irregularly shaped objects) into a display surface for image and video projection. The objects may be complex industrial landscapes, such as buildings, small indoor objects or theatrical stages. Using software, a two or three-dimensional object is spatially mapped on a virtual program that mimics the real environment that is to be projected on. The software may interact with a projector to fit any desired image onto a surface of that object.

A position enabled projector (PEP) is a tool that projects an image, such as a blueprint, onto a work surface at its true position with true scale. Being able to correctly project the position of the image onto a surface may involve determining various parameters, such as the position or orientation of the projector itself, the characteristics of the surface that the image is being projected onto, and where each of the projected pixels of the image will appear on the surface.

The projection of image points on a surface at their true positions along with true scale is particularly important if a specific task to be performed requires precision and accuracy. For instance, a blueprint may be projected onto a work surface so as to allow a construction worker to drill holes at various specified positions on the surface based on the information provided by the blueprint. In order to project the blueprint at the correct position on the work surface, the projector needs to know where each of the projected pixels of the image will appear on the work surface. But off-the-shelf projectors or other types of projector modules are not designed and built for this purpose, and thus, they are inherently unstable and the projector components (such as the light source, mirror array, etc.) are physically moving relative to their initially installed positions over time, temperature, and mechanical stress (projector intrinsics). Moreover, the mechanical fixing(s) between the projector and the positioning system may move as well (projector extrinsics).

One solution for the above-described problem may be to recalibrate the whole projector/positioning system offline and on a well-defined calibration jig to measure the projector intrinsic and extrinsic parameters, which can then be used to correctly project the image again. The disadvantage of this approach, however, is that the recalibration procedure requires specific setup, equipment, software, and also takes time and extra effort, thereby rendering this approach practically unfeasible for a projector to be used on a construction site.

In at least that regard, there is a need to recalibrate a projector system in the field and/or in real time based on determined projector calibration parameters in order to project an image at its correct position.

SUMMARY OF THE INVENTION

In accordance with one or more aspects of the present invention, the invention is directed to a system and method for recalibrating a projector system.

By way of example, the projector may be calibrated using one or more cameras arranged near or adjacent to a projector of a projector system. During operation of the projector system, the projector may project one or more specific patterns onto a work surface, where the one or more cameras may be configured to capture each of the projected patterns on the surface. All of the captured images of the patterns may be used to determine projector calibration parameters in order to properly recalibrate the projector and project an image at the correct position based on the determined projector calibration parameters.

The one or more cameras of the projector system may be calibrated only once off-site (such as in a factory where the projector system is produced and/or assembled) and may also be installed in a mechanically stable manner so that they do not move or change positions relative to each other. In at least that regard, the positional relationship between the one or more cameras is a known parameter. Moreover, stabilizing the one or more cameras is an easier requirement than stabilizing the projector itself since the cameras may be easier to install and also smaller in size than the projector. Thus, cameras are easier to make stable than the projector when assembling and/or producing the projector system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
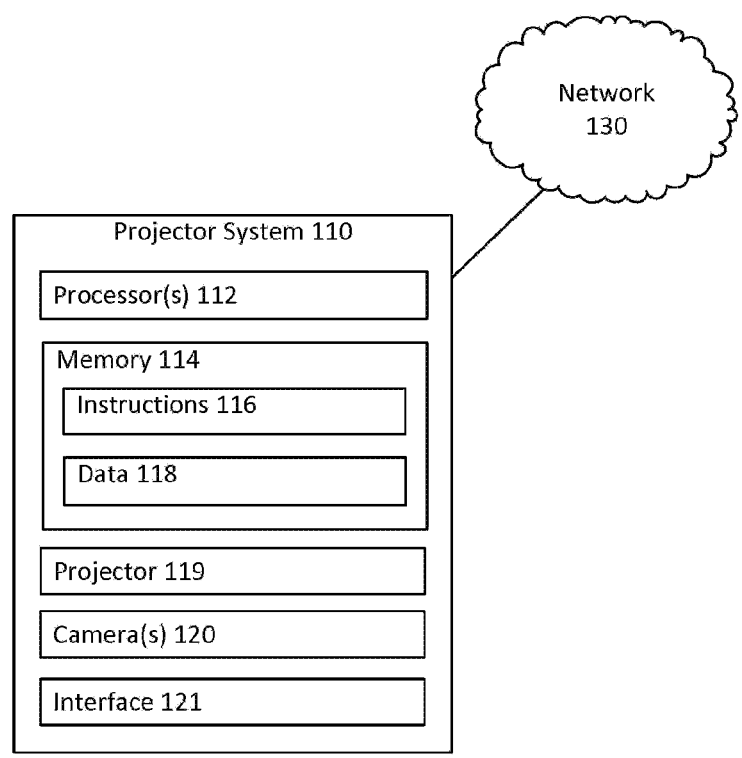
FIGS. 1 and 2 illustrate projector systems in accordance with one or more principles of the present invention.

The present invention is directed to correctly and accurately projecting, using a projector system, a two-dimensional image (e.g., a construction-related blueprint) onto an uneven work surface, such as corrugated steel sheet, and automatically recalibrating the projector system (either by the projector system on-site itself or the user on-site) so that the pixels of the image actually appear where they are supposed to appear on the work surface. Surface profiling and projecting an image onto the profiled surface by a projector system are described in U.S. application Ser. No. 15/639,308, filed Jun. 30, 2017, the contents of which are incorporated herein by reference in its entirety.

In one embodiment of the present invention, a projector system may include a projector and one or more cameras, and the components of the whole projector system, including the cameras, may be calibrated and installed/stabilized, only once, in the off-site location (e.g., factory) where the projection system is produced and/or assembled. For instance, it may be easier to make mechanically stable the one or more cameras of the projector system than the projector itself. Thus, the positional relation between the one or more cameras is a known (and, importantly, a calibrated) parameter that should not change due to time or external stresses as the projector system is being operated in the field, such as a construction site.

During operation of the projector system, one or more patterns may be projected onto the work surface. It is not necessary to know the exact location and geometry of the work surface. The projected one or more patterns may include a specific shape (e.g., square, rectangle, triangle, etc.) or a combination of different types of shapes. As the one or more patterns are projected onto the work surface, the one or more cameras may capture each of the projected patterns.

All the captured images of the patterns are then used to determine projector calibration parameters. In one example, the correspondences between points from all cameras and the projector are computed. Thereafter, the unknown projector calibration parameters may be solved by equation system(s), which will be further described below. The computed projector calibration parameters may then be used for projecting a positionally correct image onto the work surface. Thus, the projection of the image at the correct position based on the projector calibration parameters relates at least to the recalibration of the projector system. The determination of the projector calibration parameters may be performed on-site and/or in real time so that time and costs associated with recalibrating the projector system are saved.

One of the numerous advantages of the present invention, which is further described below, is that the determination of the projector calibration parameters is based on known parameters (e.g., the positional relationship between the multiple cameras in relation to the projector) that will not change or easily change over time and/or external stresses, such as temperature or mechanical damage or stress. Moreover, the recalibration of the projector system can be performed on-site, in real-time, and/or simultaneously while the projector system is profiling the work surface.

The invention described herein may be implemented on and executed by one or more computing devices and/or one or more processors. For instance, the projector system may have computing capabilities, by way of example, one or more processors, central processing units (CPUs), etc. As will be further described below, the computing associated with determining projector calibration parameters according to aspect(s) of the present invention may be executed by computing hardware in the projector system itself. Alternatively, the processing may be performed by a separate portable computing device, such as a laptop, tablet computer, or any other suitable type of mobile computing device that can be operated by a user.

FIG. 1 illustrates an example projector system 110 in accordance with one or more principles of the present invention. As shown, the projector system 110 includes one or more processors 112, memory 114 (which includes instructions 116 and data 118), at least one projector 119, at least one camera 120, and at least one interface 121. The processor 112 may instruct the components of the projector system 110 to perform various tasks based on the processing of information and/or data that may have been previously stored or have been received, such as based on the instructions 116 and/or data 118 stored in memory 114. The processor(s) 112 may be a standard processor, such as a central processing unit (CPU), graphics processor, or may be a dedicated processor, such as an application-specific integrated circuit (ASIC) or a field programmable gate array (FPGA).

The instructions 116 may be one or more sets of computer-executable instructions (e.g., software) that can be implemented by the processor 112. Data 118 may include various types of information (which can be retrieved, manipulated and/or stored by the processor 112), such as information to be projected by the projector 119, information captured by the one or more cameras 120, etc.

The projector 119 may be any object, apparatus, or device with a system of lenses that is used to project rays of light that form an image that is generated by a processor or computing device for projection. The one or more cameras 120 may be an optical instrument, apparatus, or device that is sued for recording or capturing images, which may be still photographs and/or sequences of images constituting a video or movie. While FIG. 1 illustrates a camera, it may be understood that any type of image capturing device may be used, such as a thermographic camera (infrared), etc.

Interface 121 may be any component that allows interfacing with an operator or user. For example, interface 121 may be a device, port, or a connection that allows a user to communicate with the projector system 110, including but not limited to a touch-sensitive screen, microphone, camera, and may also include one or more input/output ports, such as a universal serial bus (USB) drive, various card readers, etc. The interface 121 may also include hardware and/or equipment for surface profiling, such as one or more sensors, one or more range meters, etc.

Additionally, the projector system 110 may be configured to communicate with other computing devices via network 130. For example, the projector system 110 may communicate with other projector systems, mobile computing devices (e.g., laptops, tablet computers, smartphones). The network 130 may be any type of network, such as LAN, WAN, Wi-Fi, Bluetooth, etc.

Although the processing related to determining the projector calibration parameters are carried out by the one or more processors 112 of the projector system 110, it may be understood that the processing may be performed by external computing devices and/or hardware, such as a mobile computing device, that may be communicating with the projector system 110 via the network 130.

Figure 2:
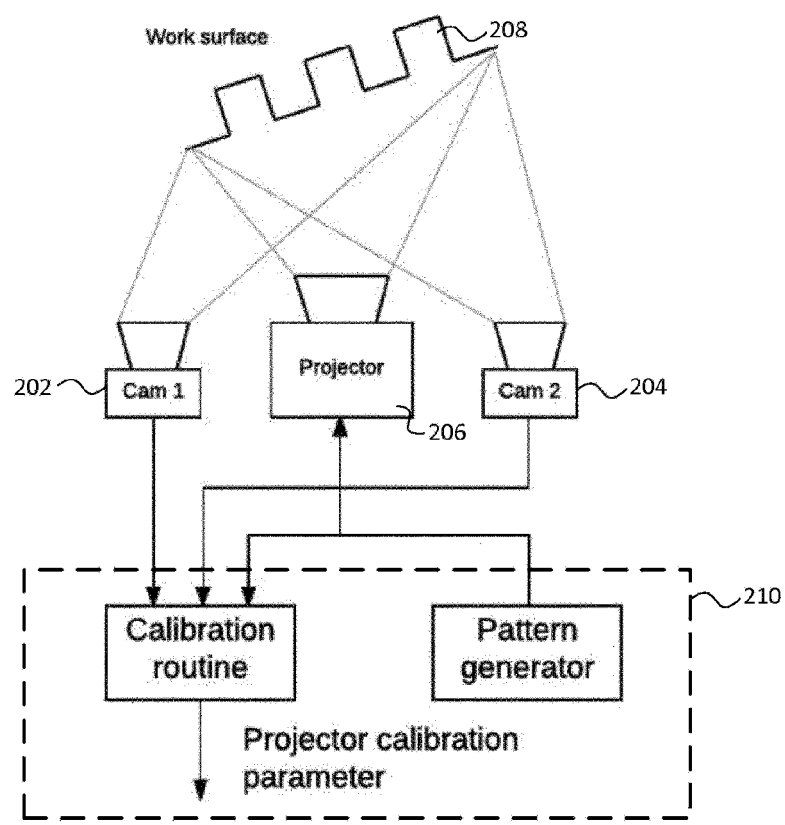

FIG. 2 illustrates the various components of a projector system 200 in accordance with one or more principles of the present invention. As shown, the projector system 200 may be configured in a similar manner to the projector system 110 of FIG. 1. For example, the projector system 200 may include at least two different cameras 202 and 204, which are arranged on opposing sides of a projector 206. The projector 206 may project an image, such as a construction-related blueprint for drilling various holes, onto a work surface 208, which in FIG. 2, may be a corrugated steel sheet. And for determining projector calibration parameters, the projector 206 may also be configured to project one or more patterns, as described above. The two cameras 202 and 204 may each capture images of the projection of each of the patterns onto the work surface 208, as also shown in FIG. 2.

In addition, FIG. 2 illustrates a pattern generator for generating and projecting the various patterns and a calibration process or routine for determining the projector calibration parameters (which will be further described below), which are depicted inside of the dashed box, as shown in FIG. 2. The dashed box represents that the above-described pattern generation and calibration process/routine for determining the projector calibration parameters may be performed or executed by one or more processors and/or one or more computing devices. For instance, the one or more processors may be the one or more processors 112 illustrated in FIG. 1. In that regard, the one or more processors 112 may be configured generate one or more specific patterns associated with the calibration process, as described above, and further the one or more processors 112 may then be configured to determine all requisite projector calibration parameters for recalibrating the projector system in order to accurately project images onto the work surface.

Moreover, as described above, the two cameras 202 and 204 may be arranged in the projector system 200 in a mechanically stable manner relative to each other and also relative to the projector 206. It is understood that mechanical stability may be provided in any fashion, such as by way of screws, fasteners, adhesive substance, etc. The overall effect, for example, of mechanical stability is that the cameras 202 and 204 will not move or change in position regardless of time, temperature, and mechanical stress, especially compared to the position and stability of the projector 206. In that way, the two cameras 202 and 204 may also be smaller in size than the projector 206 in order to achieve the above-described effect.

The calibration process/routine for acquiring, analyzing, and/or determining the various projector calibration parameters will now be described. According to an exemplary embodiment of the present invention, a set of projector calibration parameters may include intrinsic parameters and extrinsic parameters. For instance, the intrinsic parameters (for a linear projector model, e.g., pinhole model) may include:

(i) projector focal lengths in x-direction and y-direction ($f_x$, $f_y$)

(ii) principal point in x-direction and y-direction ($t_x$, $t_y$), and (iii) skew coefficient between x-axis and y-axis (s).

Moreover, the extrinsic parameters may include:

(i) translation vector between the projector and the one or more cameras (which may be known as a "camera assembly") (t), and (ii) rotation matrix between projector and camera assembly (R).

In instances, where the camera-projector model is more complex, the set of projector calibration parameters may also include a set of distortion coefficients, etc. Not all projector calibration parameters are required to be estimated at the same time, as it may be understood that only a subset of the parameters can be derived at a time.

In at least that regard, the complete camera-projector calibration matrix including the intrinsic and extrinsic parameters may be represented as follows:

$$C = K * E = K * [R | t] \text{ where}$$

$$K = \begin{bmatrix} f_x & s & t_u \\ 0 & f_y & t_v \\ 0 & 0 & 1 \end{bmatrix}$$

is the intrinsic calibration parameter matrix. The variables R and t are the rotation matrix and translation vector between a camera or projector and a world coordinate system, respectively. The variables $t_u$ and $t_v$ denote the translation between optical axis and image sensor coordinate system. The variable C is a [3×4] calibration matrix.

Once the complete calibration matrix C is known, the intrinsic calibration matrix K, the rotation matrix R and the translation vector t may be determined by standard matrix decomposition or other types of suitable decomposition techniques.

With respect to a projected point on the work surface, the projected point may be represented by the variable k and has homogenous coordinates:

$$P_k = (x_k, y_k, z_k, 1)^T$$

For example, the projected point originates from the pixel of the projector image, which may be represented by:

$$P_p = C_p P_k \quad (1)$$

The same projected point appears on a camera image plane (e.g., for the first camera) represented by:

$$P_{c1} = C_{c1} P_k \quad (2)$$

The projected point appears on a different camera image plane (e.g., for the second camera) represented by:

$$P_{c2} = C_{c2} P_k \quad (3)$$

where $P_p$, $P_{c1}$, and $P_{c2}$ are of the form $P = (u\ v\ m)^T$.

It may be understood that the two-dimensional image coordinates that are observable are represented by:

$$(u/w, v/w) = (u', v')$$

By way of example, writing out the above-described matrix equations (1) to (3) results in six different scalar equations:

$$u'_p (C_p^{(3)} P_k) - C_p^{(1)} P_k = 0$$

$$v'_p (C_p^{(3)} P_k) - C_p^{(2)} P_k = 0$$

$$u'_{c1} (C_{c1}^{(3)} P_k) - C_{c1}^{(1)} P_k = 0$$

$$v'_{c1} (C_{c1}^{(3)} P_k) - C_{c1}^{(2)} P_k = 0$$

$$u'_{c2} (C_{c2}^{(3)} P_k) - C_{c2}^{(1)} P_k = 0$$

$$v'_{c2} (C_{c2}^{(3)} P_k) - C_{c2}^{(2)} P_k = 0$$

where $C^{(n)}$ is the n-th row of the matrix C.

The camera calibration matrices $C_{c1}$ and $C_{c2}$ are known based on how the cameras were calibrated off-site (e.g., at the factory). The pixel coordinates of the projector $u'_p$, $v'_p$ and the cameras $u'_{c1}$, $v'_{c1}$ and $u'_{c2}$, $v'_{c2}$ are known from the prior step of determining these correspondences. However, the locations $P_k$ of the points on the work surface are not known and the projector calibration matrix $C_p$ is not known.

In order to determine the locations $P_k$ of the points on the work surface and the projector calibration matrix $C_p$, any solver for (e.g., nonlinear) overdetermined equation systems, such as the Levenberg-Marquardt algorithm, may be used to find a solution for the projector calibration matrix $C_p$. Moreover, as a byproduct, the point locations $P_k$ can also be solved and a three-dimensional depth map of the work surface may be obtained. The determined projector calibration parameters and/or locations of the points may then be used to recalibrate the projector system, if needed.

It may be understood that in the case where only the correspondence of one point $P_1$ is present, there is a system of equations with six equations and 15 unknowns. For every point that is added, six new equations are generated with three more new unknowns. As such, at least four points may be needed such that 24 equations for 24 unknowns are generated to obtain a unique solution to the equation system. Practically, many more points may be used, which makes the equation system overdetermined. Moreover, it may be understood that the above-described determination principles apply to a different number of cameras. And depending on the number of cameras, more or less correspondence points may be needed for the solution to become unique.

Variants and/or alternative embodiments of the above-described embodiment of the present invention will now be described.

In one embodiment, projector recalibration may be implemented and combined with the step of surface profiling (as further described U.S. application Ser. No. 15/639,308, as set forth above). In that regard, recalibration and surface profiling may be executed by the projector system simultaneously. Accordingly, for example, an alternative to projecting specific patterns is projecting other types of patterns (e.g., decoded patterns) used by a structured light approach to surface profiling may be used as input for solving the equation system(s) for the unknown projector calibration parameters.

In another embodiment, an alternative to projecting specific patterns onto the work surface to determine the projector calibration parameters is using the regular user image (e.g., construction-related blueprint image) that is projected onto the surface during operation on-site (for example, at a construction site).

In yet another embodiment, the change in projector calibration parameters due to temperature or mechanical stress may be relatively small in practical situations, which results in small amounts of parameter deviation from the factory calibration parameters. In order to account for these small deviations, the solution for the equation system above may be constrained to be close to a given set of calibration parameters, which can be derived, for instance, from the actual factory calibration.

In a further embodiment, a positioning system (which includes the one or more cameras) may separately be attached or snapped onto an off-the-shelf projector. If there is at least one camera with an overlapping field of view with the projector, the techniques described in the present invention may be used to determine the intrinsic (e.g., focal length, etc.) and extrinsic (e.g., relative position of projector to positioning system) projector calibration parameters. In at least that regard, the off-the-shelf projector may be used to project a positionally correct image on the work surface.

In yet a further embodiment, the present invention may be applied to any projector-camera system, not only in the visual light spectrum, but also for example in the infrared spectrum, as numerous commercial three-dimensional sensors use projector-camera pairs (such as infrared).

Figure 3:
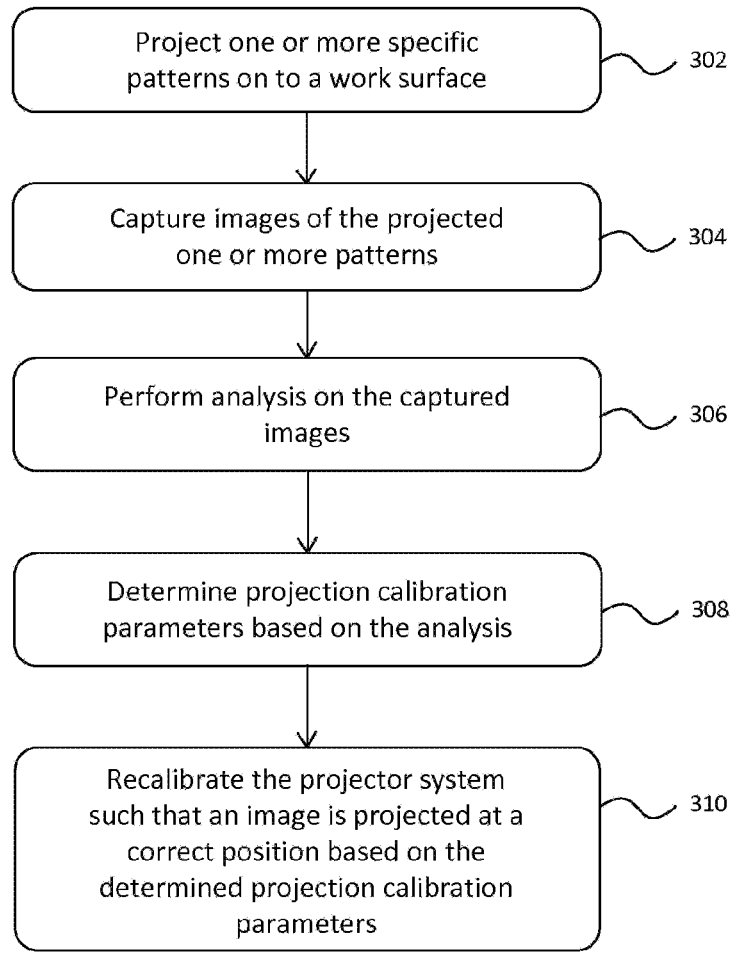
FIG. 3 illustrates a flow diagram in accordance with one or more principles of the present invention.

FIG. 3 illustrates a flow diagram 300 of recalibrating a projector system in accordance with one or more principles of the present invention. It may be understood that the steps of the flow diagram 300 may be performed or executed by one or more processors of a computing device, whether it may be via the example system 100 of FIG. 1 or via the one or more processors 112 of the projector system 110. Moreover, it may be understood that order of the steps in FIG. 3 may not be limited thereto, but may be arranged in any suitable order.

In step 302, a projector of the projector system may project on to a work surface one or more specific patterns. In step 304, images of each of the projected patterns may be captured by one or more cameras of the projector system. As described above, the specific patterns may include any suitable geometric shape, e.g., rectangles, squares, triangles, etc. or any suitable combination thereof.

In step 306, analysis is performed by the one or more processors on the captured images. The analysis may involve and include ascertaining various parameters from the projected patterns in order to solve the equation system(s), described above, along with the parameters that are already known, such as the positional relationship of the cameras with respect to each other and the projector, etc.

In step 308, the projector calibration parameters are determined based on the analysis in step 306, and in step 310, the projector system recalibrates in order to project an image onto the work surface at a correct position based on the determined projector calibration parameters.

Numerous advantageous of the present invention, include but are not limited to: the projector not having to be stable over time and temperature; recalibration of the projector may be performed in the field; recalibration may be done without user intervention; no specific calibration setup is required; recalibration and surface profiling may be performed simultaneously; and the projector focus may be adjusted manually to show a crisp image and the projector may automatically adjust to this focus setting so as to guarantee correct position and projection. An overarching advantage of the present invention is that recalibrating the projector system, for example on-site and in real-time, will increase overall accuracy of the projector system, especially in fields where precision and accuracy of the projection of an image is required. The recalibration is, thus, performed essentially in the hands of the user and/or operator, without having to send the projector off-site for recalibration.

The foregoing invention has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the present disclosure uses terminology and acronyms that may not be familiar to the layperson, those skilled in the art will be familiar with the terminology and acronyms used herein.

What is claimed is:

1. A recalibratable projector system, comprising:
   one or more cameras;
   a projector; and
   at least one processor configured to execute stored instructions to:
      project one or more patterns on to a work surface via the projector;
      capture images of the projected one or more patterns via the one or more cameras;
      perform analysis on the captured images of the one or more patterns;
      determine projector calibration parameters based at least in part on the performed analysis on the captured images; and
      recalibrate the projector system such that an image is projected onto the work surface by the projector at a correct position based on the determined projector calibration parameters;
   wherein the determination of the projector calibration parameters includes solving at least one equation system for unknown parameters;
   wherein the determination of the projector calibration parameters includes obtaining intrinsic parameters and extrinsic parameters;
   wherein the extrinsic parameters include one or more of: (i) translation vector between the projector and the one or more cameras and (ii) rotation matrix between the projector and the one or more cameras.

2. The recalibratable projector system of claim 1 further comprising one or more of: (i) at least one laser scanner and (ii) at least one surface profiling sensor, wherein the one or more cameras, the at least one scanner, the at least one surface profiling sensor, and the projector are configured to profile the work surface.

3. The recalibratable projector system of claim 1, wherein the one or more cameras are mechanically affixed to the recalibratable projector system and calibrated relative to each other and relative to the projector.

4. The recalibratable projector system of claim 3, wherein the calibration of the one or more cameras is performed only once and is a known parameter.

5. The recalibratable projector system of claim 3, wherein the one or more cameras are mechanically affixed to the recalibratable projector system via one or more of: (i) a screw, (ii) a fastener, and (iii) an adhesive.

6. The recalibratable projector system of claim 1, wherein the one or more patterns includes specific geometric shapes.

7. The recalibratable projector system of claim 1, wherein the determination of the projector calibration parameters includes calculating correspondences between points from the one or more cameras and the projector.

8. The recalibratable projector system of claim 1, wherein the at least one equation system is solved based on a Levenberg-Marquardt algorithm.

9. The recalibratable projector system of claim 1, wherein the intrinsic parameters include one or more of: (i) projector focal lengths in an x-direction and a y-direction, (ii) principal point in the x-direction and the y-direction, and (iii) skew coefficient between an x-axis and a y-axis.

10. The recalibratable projector system of claim 1, wherein the one or more patterns includes the image itself.

11. The recalibratable projector system of claim 1, wherein the one or more cameras includes an infrared camera.

12. The recalibratable projector system of claim 1, wherein the image is a blueprint of a construction-related task.

13. The recalibratable projector system of claim 1, wherein the projector is a position enabled projector.

14. A method for recalibrating a projector system, comprising the steps of:
projecting, by at least one processor, one or more patterns on to a work surface via a projector;
capturing, by the at least one processor, images of the projected one or more patterns via one or more cameras;
performing, by the at least one processor, analysis on the captured images of the one or more patterns;
determining, by the at least one processor, projector calibration parameters based at least in part on the performed analysis on the captured images;
recalibrating, by the at least one processor, the projector system such that an image is projected onto the work surface by the projector at a correct position based on the determined projector calibration parameters; and using the projected, recalibrated image in a construction-related task;
wherein the determining of the projector calibration parameters includes solving at least one equation system for unknown parameters;
wherein the determining of the projector calibration parameters includes obtaining intrinsic parameters and extrinsic parameters;
wherein the extrinsic parameters include one or more of: (i) translation vector between the projector and the one or more cameras and (ii) rotation matrix between the projector and the one or more cameras.

15. A non-transitory computer-readable medium comprising a set of executable instructions, the set of executable instructions when executed by at least one processor causes the at least one processor to perform a method for recalibrating a projector system, the method comprising the steps of:
projecting one or more patterns on to a work surface via a projector;
capturing images of the projected one or more patterns via one or more cameras;
performing analysis on the captured images of the one or more patterns;
determining projector calibration parameters based at least in part on the performed analysis on the captured images; and
recalibrating the projector system such that an image is projected onto the work surface by the projector at a correct position based on the determined projector calibration parameters;
wherein the determining of the projector calibration parameters includes solving at least one equation system for unknown parameters;
wherein the determining of the projector calibration parameters includes obtaining intrinsic parameters and extrinsic parameters;
wherein the extrinsic parameters include one or more of: (i) translation vector between the projector and the one or more cameras and (ii) rotation matrix between the projector and the one or more cameras.

\* \* \* \* \*